US011250850B2

(12) United States Patent
Jo et al.

(10) Patent No.: US 11,250,850 B2
(45) Date of Patent: Feb. 15, 2022

(54) ELECTRONIC APPARATUS AND CONTROL METHOD THEREOF

(71) Applicant: Samsung Electronics Co., Ltd., Suwon-si (KR)

(72) Inventors: Eun Heui Jo, Suwon-si (KR); Jae Hyun Bae, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 97 days.

(21) Appl. No.: 16/762,223

(22) PCT Filed: Nov. 1, 2018

(86) PCT No.: PCT/KR2018/013193
§ 371 (c)(1),
(2) Date: May 7, 2020

(87) PCT Pub. No.: WO2019/103347
PCT Pub. Date: May 31, 2019

(65) Prior Publication Data
US 2020/0365151 A1 Nov. 19, 2020

(30) Foreign Application Priority Data
Nov. 23, 2017 (KR) .................. 10-2017-0157180

(51) Int. Cl.
*G10L 15/22* (2006.01)
*G06F 3/16* (2006.01)
*G10L 15/30* (2013.01)

(52) U.S. Cl.
CPC .............. *G10L 15/22* (2013.01); *G06F 3/167* (2013.01); *G10L 15/30* (2013.01); *G10L 2015/223* (2013.01)

(58) Field of Classification Search
CPC .......... G10L 15/22; G10L 15/30; G06F 3/167
See application file for complete search history.

(56) References Cited

U.S. PATENT DOCUMENTS

2005/0102141 A1 5/2005 Chikuri
2008/0059175 A1 3/2008 Miyajima
(Continued)

FOREIGN PATENT DOCUMENTS

KR 10-2012-0031548 4/2012
KR 10-2013-0100280 9/2013
KR 10-2014-0106715 9/2014

OTHER PUBLICATIONS

International Search Report dated Feb. 25, 2019 from International Application No. PCT/KR2018/013193, 4 pages.

*Primary Examiner* — Ibrahim Siddo
(74) *Attorney, Agent, or Firm* — Staas & Halsey, LLP

(57) ABSTRACT

An electronic apparatus includes a communicator configured to communicate with a plurality of external apparatus. A storage is configured to store situation information. A processor is configured to, based on a first utterance of a user, control a first operation corresponding to the first utterance to be carried out from among a plurality of operations related to the plurality of external apparatuses. Situation information corresponding to each of a plurality of situations where the first operation is carried out based on the first utterance is stored in the storage. Based on a second utterance of the user, a second operation is identified corresponding to the second utterance from among the plurality of operations based on the stored situation information, and the identified second operation is carried out.

15 Claims, 12 Drawing Sheets

(56) References Cited

U.S. PATENT DOCUMENTS

2016/0104484 A1* 4/2016 Chakladar ............. G06F 40/289
　　　　　　　　　　　　　　　　　　　　704/235
2016/0357765 A1* 12/2016 Kim .................... G06F 16/9537
2017/0076720 A1 　3/2017 Gopalan et al.

* cited by examiner

FIG. 4

| USE SPACE | SPACE STATE | DOMAIN | NUMBER OF UTTERANCE | DEVICE ID AND CURRENT FUNCTIONAL STATE | | DATE AND TIME (T) | UTTERANCE CONTENT(i) |
|---|---|---|---|---|---|---|---|
| SPACE 1 (LIVING ROOM) | ILLUMINANCE HUMIDITY TEMPERATURE | WEATHER | 2 | 1(TV) | On, MOVIE WATCHING | 2017.08.22 8:00:00 | LET ME KNOW TODAY'S WEATHER |
| | | | | | | 2017.08.23 7:30:00 | HOW'S THE WEATHER TODAY? |
| | | ILLUMI-NATION | 1 | 1(TV) | | 2017.08.23 19:00:22 | TURN ON THE LIGHT |
| | | MUSIC | 2 | 2(SPEAKER) | Off | 2017.08.22 16:10:00 | TURN ON TODAY'S WEATHER |
| | | | | 2(SPEAKER) | | 2017.08.23 16:00:33 | TURN ON SOME GOOD MUSIC |
| SPACE 2 (KITCHEN) | ILLUMINANCE HUMIDITY TEMPERATURE | FOOD | 1 | 5(TV) | On, COOKING CHANNEL | 2017.08.22 8:10:00 | RECOMMEND GOOD FOOD FOR TODAY'S WEATHER |
| | | ILLUMI-NATION | 1 | 5(TV) | | 2017.08.23 7:30:00 | TURN ON THE LIGHT |
| | | DEVICE CONTROL | 2 | 3(COOKTOP) | Off | 2017.08.23 17:00:22 PM | TURN ON THE LIGHT |
| SPACE 3 (ROOM 1) | ILLUMINANCE HUMIDITY TEMPERATURE | DEVICE CONTROL | 5 | 4(ILLUMI-NATION OF ROOM 1) | On | 2017.08.23 21:20:00 PM | TURN ON |
| | | DEVICE CONTROL | 0 | 2(SPEAKER) | Off | | TURN ON |

$$S(v_c, v_i) = \cfrac{1}{((1-\alpha) * D_t(t_c, t_i) + \alpha * D_i(i_c, i_i))} * c, \forall i \in \text{all speech in DB}$$

$S(v_c, v_i)$ : SIMILARITY BETWEEN $v_c$ (CURRENTLY INPUT UTTERANCE) AND $v_i$ (UTTERANCE STORED IN DB)

$D_t(t_c, t_i)$ : DIFFERENCE BETWEEN $t_c$ (INPUT TIME OF CURRENTLY INPUT UTTERANCE) AND $t_i$ (INPUT TIME OF UTTERANCE STORED IN DB)

$D_i(i_c, i_i)$ : DIFFERENCE BETWEEN $i_c$ (CURRENTLY INPUT UTTERANCE CONTENT) AND $i_i$ (UTTERANCE CONTENT STORED IN DB)

$\alpha$ : WEIGHT FOR EACH SELECTION CRITERIA

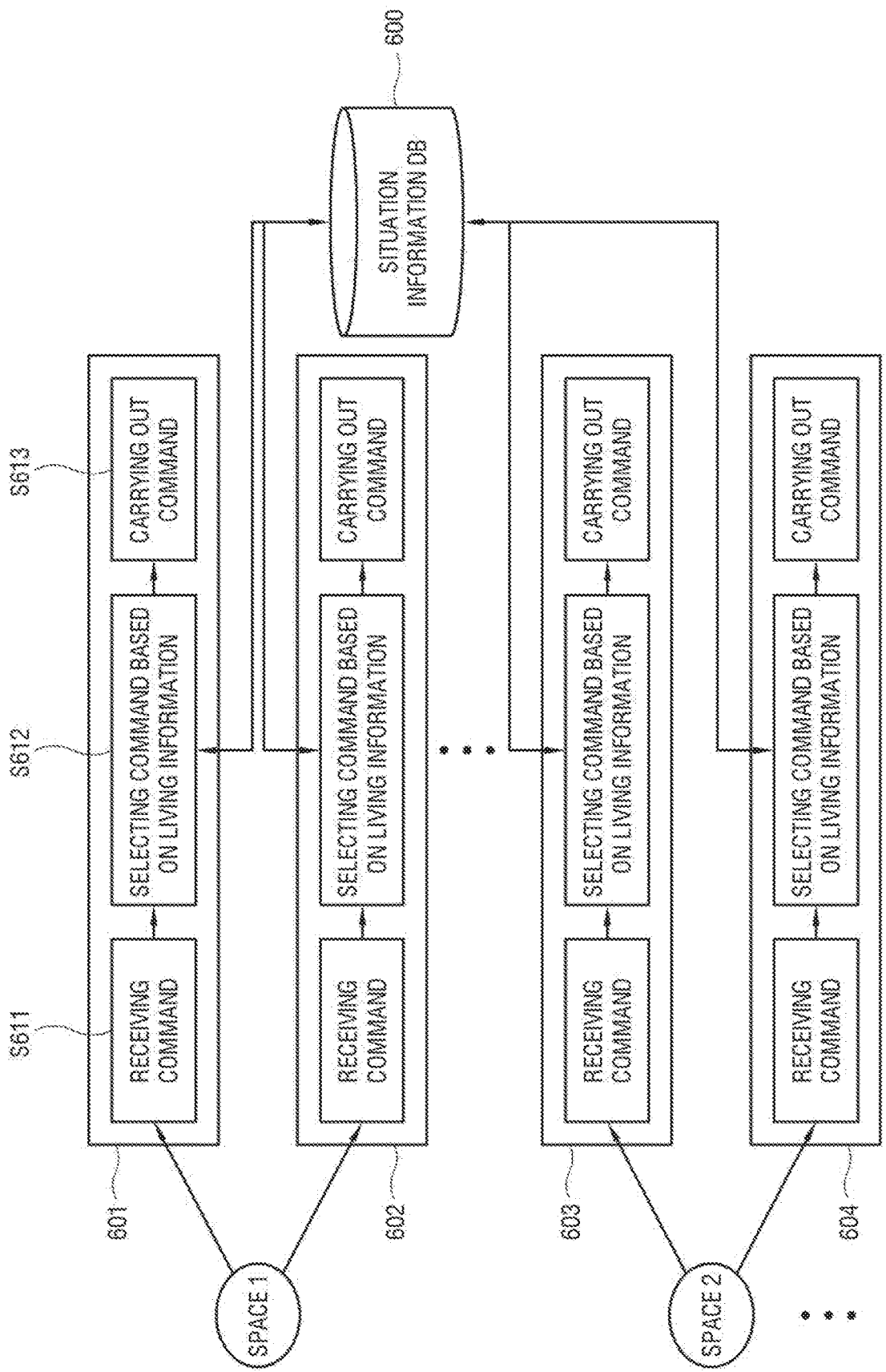

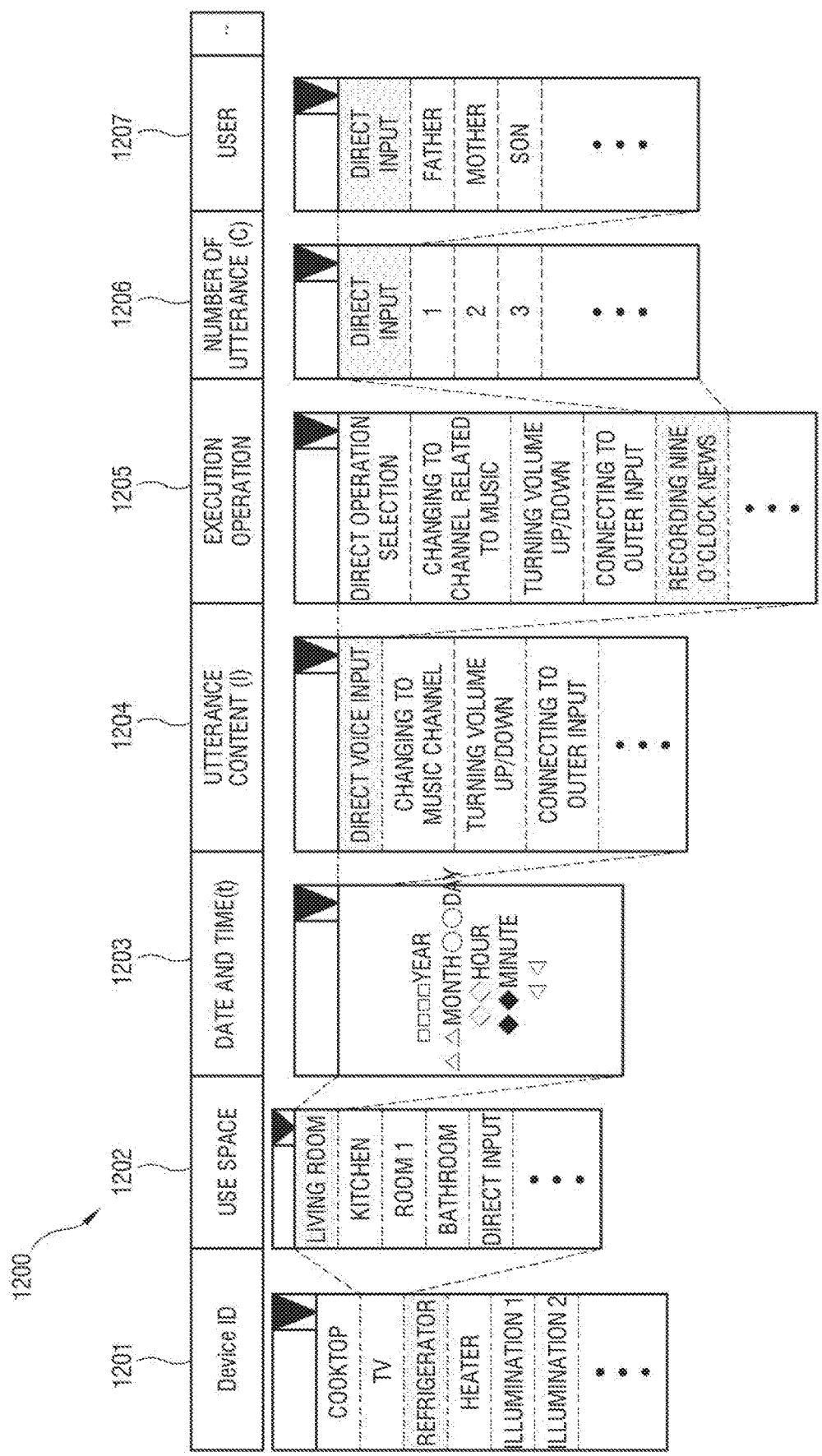

ELECTRONIC APPARATUS AND CONTROL METHOD THEREOF

CROSS-REFERENCE TO RELATED APPLICATIONS

This application is a U.S. National Stage Application which claims the benefit under 35 U.S.C. § 371 of International Patent Application No. PCT/KR2018/013193 filed on Nov. 1, 2018, which claims foreign priority benefit under 35 U.S.C. § 119 of Korean Patent Application No. 10-2017-0157180 filed on Nov. 23, 2017 in the Korean Intellectual Property Office, the contents of both of which are incorporated herein by reference.

TECHNICAL FIELD

Apparatuses and methods consistent with embodiments relate to an electronic apparatus and a control method thereof, and more particularly, an electronic apparatus, which can recognize a user's voice, a control method thereof and a computer program product therefor.

BACKGROUND ART

In recent years, electronic apparatuses may carry out a command according to a user's voice. An electronic apparatus may recognize the user's voice to carry out an operation corresponding thereto. If the electronic apparatus is an apparatus which does not the operation, it may transmit a command corresponding to the user's voice to other electronic apparatus.

In the voice recognition, if a user utters a sentence including all information, which is required for the electronic apparatus to carry out the operation, the electronic apparatus may recognize the user's voice to carry out the command corresponding thereto. However, in general daily life, the user utters a free style sentence from which some among required information is omitted.

According to related arts, if the user utters an imperfect sentence toward the electronic apparatus as if talking to a person, there is a problem that the electronic apparatus may not carry out a command corresponding to a voice recognized from the uttered sentence, or carry out an operation different from a user's intention.

DISCLOSURE

Technical Problem

Embodiments provide an electronic apparatus, which in voice recognition, if receiving an imperfect sentence uttered by a user, can predict a user's intention and select to carry out a proper command corresponding thereto, a control method thereof and a computer program product therefor.

Technical Solution

According to an embodiment, an electronic apparatus includes: a communicator configured to communicate with a plurality of external apparatus; a storage configured to store situation information; a processor configured to: based on to a first utterance of a user, control to carry out a first operation corresponding to the first utterance from among a plurality of operations related to the plurality of external apparatuses; store, in the storage, situation information corresponding to each of a plurality of situations where the first operation is carried out based on the first utterance; based on a second utterance of the user, identify a second operation corresponding to the second utterance from among the plurality of operations based on the stored situation information; and control to carry out the identified second operation. With this, the electronic apparatus may predict a user's intention in free utterance and thus reduce a malfunction thereof.

The situation information may include a plurality of factors including at least one of a device, a space, a time, or a space state. Accordingly, the electronic apparatus may more precisely predict the user's intention.

The processor may be configured to identify the second operation by further considering a similarity in at least one factor from among a plurality of factors, and a similarity of utterance content. Accordingly, the electronic apparatus may predict the user's intention with greater precision.

The processor may be configured to store or edit the situation information according to an input of the user. Accordingly, the electronic apparatus may store the situation information optimized to the user to predict the user's intention with greater precision.

The apparatus may further include a display configured to output a screen, and the processor may be configured to store or edit the situation information by using a user interface (UI) output on the screen. Accordingly, the user may conveniently edit the situation information.

The processor may be configured to preferentially identify an operation to apply similarity identification thereto based on a number of times of operation performance. Accordingly, the electronic apparatus may carry out the operation where the user frequently uses thus to reduce the malfunction thereof.

The processor may be configured to classify and store the situation information according to categories of a plurality of factors. Accordingly, the electronic apparatus may more efficiently carried out the similarity identification process.

The processor may be configured to classify and store the situation information according to users of a plurality of factors. Accordingly, the electronic apparatus may efficiently carried out the voice recognition according to users.

According to an embodiment, a control method of an electronic apparatus includes: based on to a first utterance of a user, controlling to carry out a first operation corresponding to the first utterance from among a plurality of operations related to a plurality of external apparatuses, which is able to communicate with the electronic apparatus through a communicator thereof; storing, in a storage, situation information corresponding to each of a plurality of situations where the first operation is carried out based on the first utterance; based on a second utterance of the user, identifying a second operation corresponding to the second utterance from among the plurality of operations based on the stored situation information, and controlling to carry out the identified second operation. With this, the electronic apparatus may predict a user's intention in free utterance and thus reduce a malfunction thereof.

The situation information may include a plurality of factors including at least one of a device, a space, a time, or a space state. Accordingly, the electronic apparatus may more precisely predict the user's intention.

The identifying may include identifying the second operation by further considering a similarity in at least one factor from among a plurality of factors, and a similarity of utterance content. Accordingly, the electronic apparatus may predict the user's intention with greater precision.

The method may include storing or editing the situation information according to an input of the user. Accordingly, the electronic apparatus may store the situation information optimized to the user to predict the user's intention with greater precision.

The method may include storing or editing the situation information by using a user interface (UI) output on a screen through a display configured to output the screen. Accordingly, the user may conveniently edit the situation information.

The identifying may include preferentially identifying an operation to apply similarity identification thereto based on a number of times of operation performance. Accordingly, the electronic apparatus may carry out the operation where the user frequently uses thus to reduce the malfunction thereof.

The storing may include classifying and storing the situation information according to categories of a plurality of factors. Accordingly, the electronic apparatus may more efficiently carried out the similarity identification process.

The storing may include classifying and storing the situation information according to users of a plurality of factors. Accordingly, the electronic apparatus may efficiently carried out the voice recognition according to users.

According to an embodiment, a computer program product includes: a memory configured to store instructions; and a processor, and when being carried out by the processor, the instructions are configured to control an electronic apparatus to: based on to a first utterance of a user, carry out a first operation corresponding to the first utterance from among a plurality of operations related to a plurality of external apparatuses, which is able to communicate with the electronic apparatus through a communicator thereof; store, in a storage, situation information corresponding to each of a plurality of situations where the first operation is carried out based on the first utterance; based on a second utterance of the user, identify a second operation corresponding to the second utterance from among the plurality of operations based on the stored situation information, and carry out the identified second operation. With this, the electronic apparatus may predict a user's intention in free utterance and thus reduce a malfunction thereof.

Advantages Effects

As described above, according to the embodiments, the electronic apparatus, the control method thereof and the computer program product therefor may figure out the user's intention from the imperfect sentence in the voice recognition to carry out the operation corresponding thereto.

DESCRIPTION OF DRAWINGS

FIG. 4 shows situation information of the electronic apparatus according to an embodiment;

FIG. 5 shows a method in which the electronic apparatus analyzes an utterance, according to an embodiment;

FIG. 6 shows an operation performance process of the electronic apparatus according to an embodiment;

FIG. 12 shows an example of another UI according to an embodiment.

BEST MODE

Figure 1:
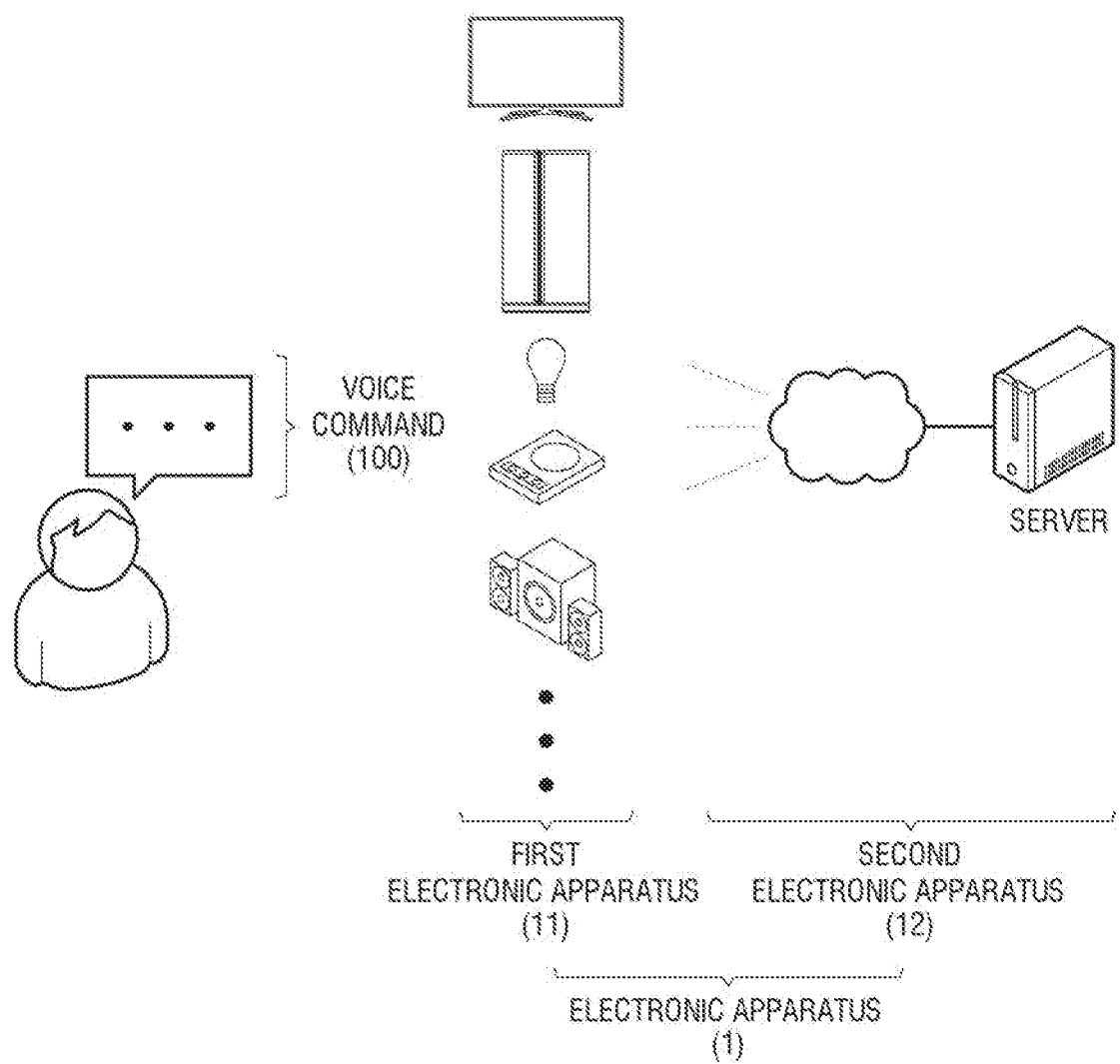
FIG. 1 shows an electronic apparatus according to an embodiment.

Below, embodiments will be described in detail by reference to accompanying drawings. In the drawings, like numerals or symbols refer to like elements having substantially the same function, and the size of each element may be exaggerated for clarity and convenience of description. However, the configurations and functions illustrated in the following embodiments are not construed as limiting the present inventive concept and the key configurations and functions. In the following descriptions, details about publicly known functions or features will be omitted if it is identified that they cloud the gist of the present inventive concept.

In the following embodiments, terms 'first', 'second', etc. are only used to distinguish one element from another, and singular forms are intended to include plural forms unless otherwise mentioned contextually. In the following embodiments, it will be understood that terms 'comprise', 'include', 'have', etc. do not preclude the presence or addition of one or more other features, numbers, steps, operations, elements, components or combination thereof. Further, in the following embodiments, a "module" or a "portion" may perform at least one function or operation, be achieved by hardware, software or combination of hardware and software, and be modularized into at least one processor.

In the following exemplary embodiments, at least one among a plurality of elements refer to not only all of the plurality of elements but also each element among the plurality of elements excluding the other elements or a combination thereof.

In recent years, a user may easily control an operation of an electronic apparatus 1 using an internet of things (IoT). There are various methods of controlling the electronic apparatus, but the following exemplary embodiments will explain with respect to controlling the electronic apparatus according to voice commands of the user. If using the voice commands and the IoT technology, the user may control the electronic apparatus via the voice commands at long range without approaching the electronic apparatus. If a voice command includes all information necessary for controlling the electronic apparatus, the electronic apparatus may carry out an operation according thereto without any malfunction. However, if the user utters a voice command corresponding to a free style sentence (hereinafter, referred to a 'free utterance') from which some information is omitted or which does not conform to a given form, it may be difficult for the electronic apparatus to carry out an operation corresponding thereto. To solve this, the electronic apparatus according to an embodiment is configured to accumulatively store situation information where voice commands are carried out or not and to use the stored situation information with respect to the voice command corresponding to the free utterance, thereby allowing the electronic apparatus to carry out an operation corresponding to a user's intention. Hereinafter, the electronic apparatus according to an embodiment will be described.

FIG. 1 shows an electronic apparatus according to an embodiment. The electronic apparatus 1 according to an embodiment may be implemented as an apparatus, such as, for example, a television (TV), a refrigerator, an illumination, a cooktop, a speaker, a server, etc., which is able to recognize a voice command 100 of the user. The electronic apparatus 1 according to an embodiment is not limited thereto, and if anything can recognize the voice command 100 of the user, it may be applied thereto. As an embodiment, the electronic apparatus 1 may be classified into two kinds of electronic apparatuses, for example, a first electronic apparatus 11 and a second first electronic apparatus 12, according to whether to or not carry out an operation corresponding to the voice command. The first electronic apparatus 11 is an apparatus, which is able to select a voice command coinciding with a user's intention and carry out an operation corresponding to the selected voice command. The second electronic apparatus 12 is an apparatus, which is able to, from a voice of the user, select the voice command coinciding with the user's intention. However, the electronic apparatus 1 according to an embodiment is not limited to such a division of roles and a number of the electronic apparatuses.

Hereinafter, the term 'the electronic apparatus 1' is used to refer to the first electronic apparatus 11 and the second first electronic apparatus 12 in unison without dividing into the first electronic apparatus 11 and the second first electronic apparatus 12 unless otherwise mentioned. The electronic apparatus 1 may be connected with other electronic apparatuses 1 by wired or wireless to communicate therewith. With this, the electronic apparatus 1 may share voice commands received by other electronic apparatuses 1 therewith. Accordingly, with respect to the voice commands received by other electronic apparatuses 1, the electronic apparatus 1 may carry out operations corresponding thereto.

Figure 2:
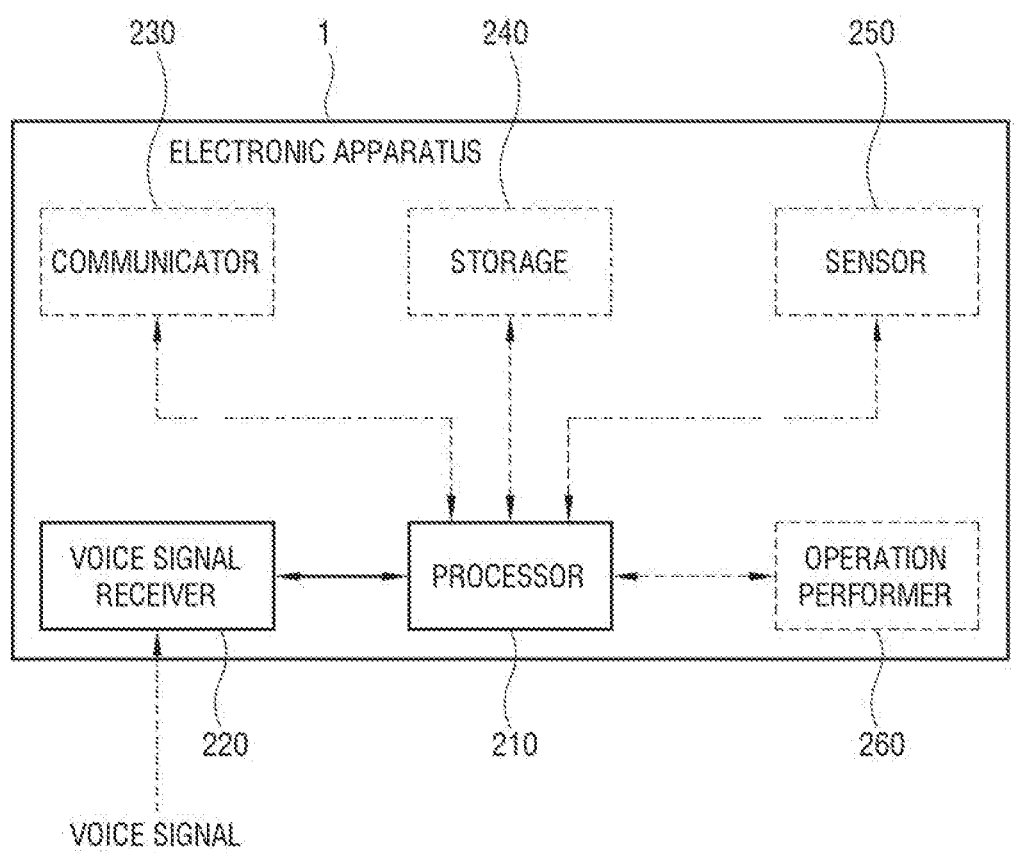
FIG. 2 shows a block diagram of the electronic apparatus according to an embodiment.

FIG. 2 shows a block diagram of the electronic apparatus according to an embodiment. The electronic apparatus 1 consists of a processor 210 and a voice signal receiver 220. The electronic apparatus 1 may further include a communicator 230, a storage 240, a sensor 250 and an operation performer 260. However, a configuration of the electronic apparatus 1 according to an embodiment shown in FIG. 2 is only an example and may be also implemented by a configuration other than the configuration shown in FIG. 2. In other words, the electronic apparatus 1 according to an embodiment may be implemented by excluding some elements from the configuration shown in FIG. 2 or adding elements other than the configuration shown in FIG. 2.

The voice signal receiver 220 receives a voice signal of the user. The voice signal receiver 220 may be provided with a mic to receive the voice signal of the user. The electronic apparatus 1 may receive the voice signal directly or indirectly. The electronic apparatus 1 may have a receiver, such as the mic or the like, to receive the voice signal directly. At this time, the voice signal receiver 220 converts an analog signal corresponding to a received voice command of the user into a digital signal, and transmits the converted digital signal to the processor 210 to carry out a voice recognition operation through a voice recognition module. The voice signal receiver 220 does not receive the voice signal of the user only by the mic, and may receive the voice signal of the user using other configuration.

The electronic apparatus 1 may indirectly receive the voice signal using other devices. For example, the electronic apparatus 1 may receive the voice signal via a mic, which is provided in a mobile device (not shown), such as a smart phone or the like, or a remote control (not shown) communicating therewith. In this case, the remote control or the mobile device converts an analog signal corresponding to a voice command received through the mic into a digital signal, and transmits the converted digital signal to the electronic apparatus 1 via the communicator 230 or the like. The communicator 230 transmits the voice signal received from the remote control or the mobile device to the processor 210 to carry out a voice recognition operation corresponding to the received voice signal.

The electronic apparatus 1 may be provided with the communicator 230, which communicates with an external apparatus or other electronic apparatuses 1 to receive the voice signal of the user. The communicator 230 may be provided in various forms according to implemented types of the display apparatus 1. For example, the communicator 230 may include a connection for wired communication. The connection may transmit and receive signals or data according to standards, such as high definition multimedia interface (HDMI), HDMI-consumer electronics control (CEC), universal serial bus (USB), component, etc. and include at least one connector or terminal corresponding to the standards. The communicator 230 may carry out wired communication with a plurality of servers via wired local area network (LAN).

The communicator 230 may be implemented in various other communication forms, besides the connection for wired communication including the at least one connector or terminal. For example, the communicator 230 may include a radio frequency (RF) circuit, which transmits and receives a RF signal to carry wireless communication with the external apparatus, and may be configured to carry out the wireless communication using more than one communication way from among Wi-Fi, Bluetooth, Zigbee, ultra-wide band (UWB), wireless USB, and near field communication (NFC).

The communicator 230 may receive the voice signal from a mobile device (not shown), which communicates with the electronic apparatus 1 using more than one from among the above described communication ways. In this case, the mobile device may be implemented as a smart phone or the like, and may install, for example, a remote control application therein and execute the remote control application to transmit the voice signal to the electronic apparatus 1 via a voice input or the like for controlling the operation of the electronic apparatus 1.

The electronic apparatus 1 may not process the voice command received via the voice signal receiver 220 or the communicator 230 by itself, but transmit and process it to and by a voice recognition server (not shown). The voice recognition server may be implemented as a speech to text (STT) server. In this case, the processor 210 transmits data of the voice command to the voice recognition server and the voice recognition server carries out voice recognition operation to convert the data of the voice command into a text.

The data of the voice command processed in the voice recognition server as above may be transmitted to the electronic apparatus 1 again or another server, which collects voice recognition results of the voice command. If the electronic apparatus 1 receives the text of the voice command converted in the voice recognition server, the processor 210 controls the electronic apparatus 1 to carry out a function corresponding to the converted text of the voice command.

At this time, the processor 210 may transmit information about the function of the electronic apparatus 1 corresponding to the converted text of the voice command to the voice recognition server or another server. Accordingly, the voice recognition server or the another server may store the information about the function corresponding to the voice recognition result of the voice command in a storage, and after that, if the data of the same voice command is received, provide the stored information to the electronic apparatus 1, so that the electronic apparatus 1 carries out the corresponding function based on the provided information.

If the voice signal receiver is provided outside the electronic apparatus 1, a communication method between the electronic apparatus 1 and the voice signal receiver may be identical to or different from a method between the electronic apparatus 1 and an external server (not shown). For instance, the electronic apparatus 1 may communicate with the voice signal receiver and the external server via Wi-Fi, and may communicate with the voice signal receiver via Bluetooth and with the external server via Ethernet.

The electronic apparatus 1 may be provided with the storage 240 to store information necessary for carrying out operations thereof. For instance, the storage 240 may accumulatively store information, such as situation information or the like, needed to carry out the operations of the electronic apparatus 1. With this, the electronic apparatus 1 may accumulatively store the information and learn the stored information to figure out a user's intention. Kinds of the storage 240 or types stored therein are not limited.

The electronic apparatus 1 may be provided with the sensor 250, which is able to sense a state of the electronic apparatus 1, a state outside the electronic apparatus 1 or the like. The sensor 250 may sense stimuluses. For instance, the sensor 250 may include an image sensor to detect location of the user or image or motion of the user, a motion sensor to detect vibration, a position sensor to detect location, a temperature sensor to detect temperature, a humidity sensor to detect humidity, an illuminance sensor to detect brightness, a color sensor to detect color, etc. The motion of the user may be also detected by the illuminance sensor or the color sensor. The sensor 250 of the electronic apparatus 1 is not limited to the sensors listed above, but may further include other sensors. The electronic apparatus 1 may include the sensor 250 provided therein, but receive stimuluses detected by separate sensors provided outside thereof via the communicator 230. For instance, an illuminance sensor or a color sensor separately installed from the electronic apparatus 1 may detect stimuluses, such as the motion of the user and the like, to transmit to the electronic apparatus 1. The electronic apparatus 1 may receive the stimuluses to use as situation information.

The electronic apparatus 1 may be provided with the operation performer 260, which carries out the operations of the electronic apparatus 1. The operation performer 260 carries out operations, which are able to be carried out by the electronic apparatus 1. At this time, the operation performer 260 may be included in the first electronic apparatus 11, but not in the second electronic apparatus 12. The operation performer 260 may include a display to output an image, a speaker to output a voice, and the like.

The processor 210 carries out control for operating general elements of the electronic apparatus 1. The processor 210 may include a control program (or at least one instruction) which carries out the control, a nonvolatile memory in which the control program is installed, a volatile memory in which at least a part of the installed control program is loaded, and at least one processor or central processing unit (CPU) by which the loaded control program is executed. Also, the control program may be stored in an electronic apparatus other than the electronic apparatus 1.

The control program may include a program(s) achieved in the form of at least one of a basic input/output system (BIOS), a device driver, an operating system, a firmware, a platform, and an application program. According to an embodiment, the application program may be previously installed or stored in the electronic apparatus 1 when the electronic apparatus 1 is manufactured, or may be installed in the electronic apparatus 1 on the basis of application program data received from the outside when used in the future. The data of the application program may be, for example, downloaded from an application market and the like external server to the electronic apparatus 1. The external server as above is an example of a computer program product according to an embodiment, but is not limited thereto.

The processor 210, for example, control the voice receiver 220 to receive the voice signal of the user. The processor 210 controls the communicator 230 to communicate with the external apparatus or other electronic apparatuses 1, controls the storage 240 to store information therein, controls the sensor 250 to detect the stimuluses, and control the operation performer 260 to carry out the operations.

Hereinafter, a communication for voice recognition between the electronic apparatus 1 and the server will be described. If a voice signal is received via the voice signal receiver 220 or the communicator 230, the processor 210 may transmit the voice signal to the server via the communicator 230. The server to which the voice signal is received may be a server which acts only as a STT device of converting data related to the voice signal into a proper text, or a server which also acts as the STT device. The server may transmit the STT-processed data to the electronic apparatus 1. Or, the server may transmit the data to another server to process it, receive the processed data from another server, and then transmit the received data to the electronic apparatus 1. To carry out a certain function, the electronic apparatus 1 may intactly use or deform the data received from the server or another server. Configuration of which the electronic apparatus 1 carries out the operation with respect to the voice signal is not limited thereto. Accordingly, the electronic apparatus 1 may be configured including the server which acts only as the STT device or the server which also acts as the STT device.

Figure 3:
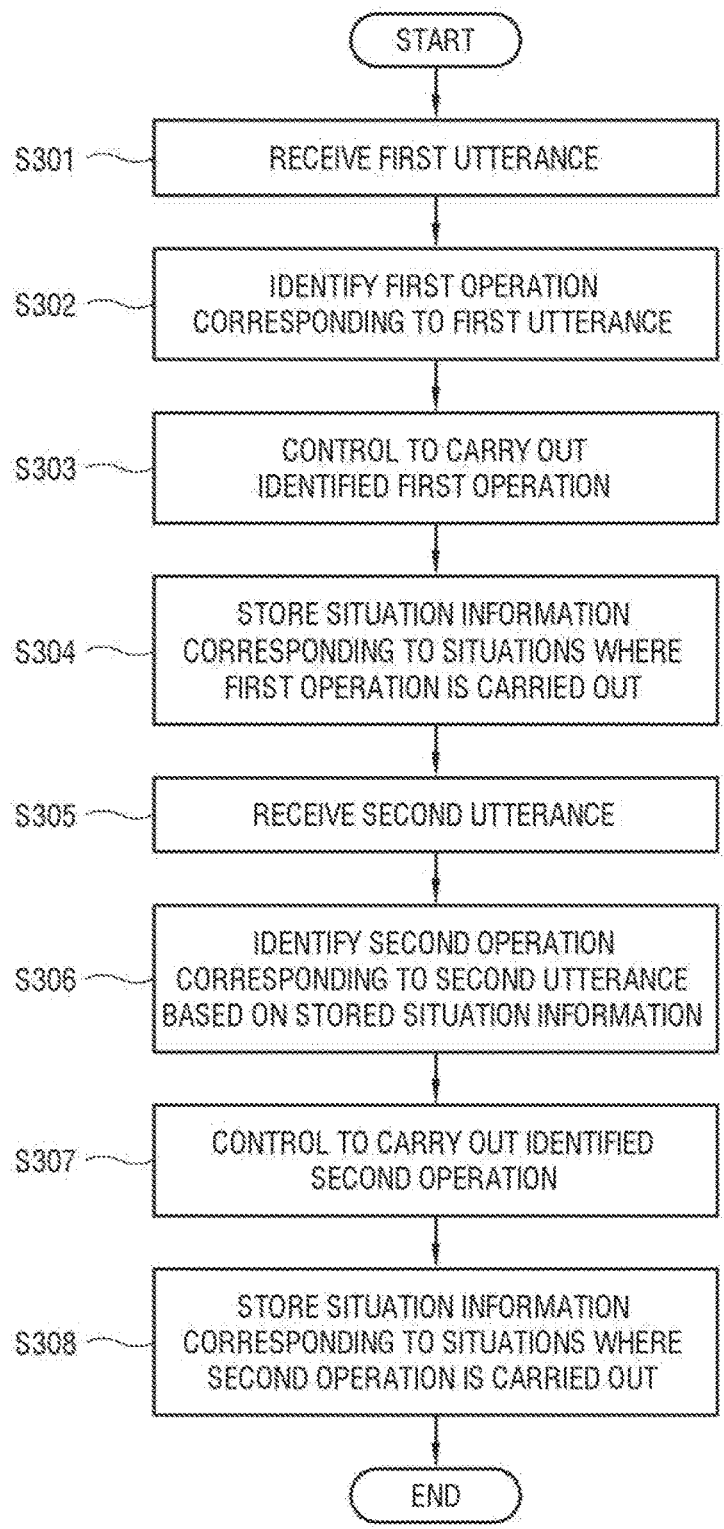
FIG. 3 shows a flowchart of operation of the electronic apparatus according to an embodiment.

Hereinafter, the processor 210 according to an embodiment will be described in detail. FIG. 3 shows a flowchart of operation of the electronic apparatus according to an embodiment. First, the processor 210 receives a first utterance of the user (Operation S301). The first utterance may include information required to carry out a command corresponding thereto. As the first utterance is received, the processor 210 identifies a first operation corresponding to the first utterance (Operation S302). The processor 210 controls to carry out the identified first operation (Operation S303). The electronic apparatus 1 may directly carry out the identified first operation, and control other electronic apparatuses 1 to carry out the identified first operation. The processor 210 stores situation information corresponding to situations where the first operation is carried out (Operation S304). The situation information may include a time when the first operation is carried out, a state of the electronic apparatus 1, a space corresponding to a location of the electronic apparatus 1, etc. This situation information may be stored, so that the processor 210 use the stored situation information later. Explanations about the situation information will be described in detail with respect to FIG. 4. After storing the situation information, the electronic apparatus 1 receives a second utterance (Operation S305). The second utterance may be identical to or similar with the first utterance. The processor 201 may use previously stored situation information to analyze the second utterance. The second utterance may include all information, which is required for the electronic apparatus 1 to carry out a second operation, but some from among the required information may be omitted therefrom. In other words, the second utterance may be a free utterance. The processor 210 predicts a user's intention in supplement to the second utterance, which is the free utterance, and identifies the second operation corresponding to the second utterance (Operation S306). After identifying the second operation corresponding to the second utterance based on the stored situation information, the processor 210 controls to carry out the identified second operation (Operation S307). The processor 210 stores situation information corresponding to situations where the second operation corresponding to the second utterance is carried out (Operation S308). As described above, the processor 210 accumulatively stores the situation information. According to this, the processor 210 may predict the user's intention from the free utterance, and thus reduce a malfunction of the electronic apparatus 1.

For instance, to know how is today's weather, a user (801 in FIG. 8) may try to ask a TV (701 in FIG. 8) in a living room with respect to today's weather. If the user (801 in FIG. 8) utters a complete sentence like "Hey TV in the living room!, let me know today's weather", the processor 201 will control the TV 701 to inform information about today's weather. Like this, if there is all information required to operate the electronic apparatus 1, for example, the TV, the TV 701 may inform the user the information about today's weather. However, it may be difficult for the electronic apparatus 1 to identify a proper command with respect to the following utterance content, such as a free utterance or the like. For instance, it is a case that the user utters "today's weather". In this case, some information required to operate the electronic apparatus 1 is omitted. Accordingly, it may be difficult for related art apparatuses, which are not the electronic apparatus 1 according to an embodiment, to carry out a proper operation. The electronic apparatus 1 according to an embodiment may carry out an utterance analysis, which is described later with reference to FIGS. to 6, thereby identifying and carrying an operation, which coincides with a user's intention.

FIG. 4 shows situation information of the electronic apparatus according to an embodiment. A reference numeral 400 shows an example of the situation information stored in the electronic apparatus 1 in a table. In the situation information, there are a use space, a space state, a domain, a number of utterance, a device identification (ID) and current functional state, an utterance day and time, an utterance content, etc. Kinds of the situation information are not limited thereto, and much more information may be stored according to situations. With this, the electronic apparatus may more precisely predict the user's intention. The processor 210 may control to classify and store the situation information according to categories of a plurality of factors. Accordingly, the electronic apparatus may more efficiently carry out a similarity identification process. Also, the processor 210 may control to classify and store the situation information according to users of the plurality of factors. Accordingly, the electronic apparatus 1 may efficiently carry out the voice recognition according to users.

The use space may be classified into, for example, a living room, a kitchen, and a room 1. The use space is not limited thereto, and the user may set much more use space.

Information about the use space of the electronic apparatus 1 may be input in advance before the user use it. Accordingly, the electronic apparatus 1 may use the situation information about the use space input in advance. If the situation information about the use space is not input in advance in the electronic apparatus 1, the user may set the use space via a user input or the electronic apparatus 1 may set the use space through learning. What the user sets the use space via the user input will be explained with respect to FIG. 12.

If the situation information is not input in the electronic apparatus 1, the electronic apparatus 1 may automatically set the use space through the learning without any user input. For instance, if the same voice command is input into a plurality of electronic apparatuses 1 as the same time, each electronic apparatus 1 may set as being in the same use space. In other words, if the same voice command is input into a first electronic apparatus 1 in which the use space is input and a second electronic apparatus 1 in which the use space is not input as the same time, the second electronic apparatus 1 in which the use space is not input may be set as being in the same use space as the first electronic apparatus 1 in which the use space is input.

As another example where the electronic apparatus 1 learns, the electronic apparatus 1 may use a database of other electronic apparatuses 1. For instance, the electronic apparatus 1 may analyze the database used by the users according to electronic apparatuses, and thus build databases, each of which sets as electronic apparatuses 1 in the same space if showing the same trend. Or, the electronic apparatus 1 may analyze the database to build databases of the electronic apparatuses 1 according to users showing the same trend. Accordingly, even though a plurality of users in the same space uses the databases, since the databases are built according to users, the same electronic apparatus 1 may carry out different operations according to users even by the same command.

As other example where the electronic apparatus 1 learns, a first electronic apparatus 1 may analyze a database of a second electronic apparatus 1 to build a situation information database of the electronic apparatuses 1. For instance, a new electronic apparatus 1 for which the database is not built may use existing situation information database of other electronic apparatuses 1. Accordingly, without any inconvenience of manually setting the new electronic apparatus 1 for which there was no database, the user may use the new electronic apparatus 1.

The space state may represent result values for data received via the communicator 230 or all sorts of stimuluses detectable by the sensor 250. The illuminance, the humidity, the temperature, etc. may be expressed. The processor 210 may figure out a user's intention by means of the space state.

The processor 210 may identify the domain by reference to the utterance content. For instance, if the utterance content is "Turn on the light", the processor 210 may set a device control or an illumination as the domain.

The number of utterance means a number of times where an operation has been carried out according to a previously uttered content. For instance, at an illumination (device ID: 4) of a room 1, the number of times where the operation has been carried out according to the previously uttered content is 5. If using the number of utterance, the processor 210 may recognize commands where the user frequently uses, thereby increasing a weight in similarity identification.

The device ID and current functional state represent IDs (marked with numerals in the table) set to devices, and current functional states thereof. For instance, a current state of a TV (device ID: 1) in a living room is being turned on and displaying a movie channel. Also, a current state of a TV (device ID: 5) in a kitchen is being turned on and displaying a cooking channel. The processor may figure out the user's intention by means of the current functional state of the devices.

The date and time is a time when a device carries out a certain operation or receives a voice uttered by the user. The processor 210 may figure out the date and time when the device carries out the certain operation or receives the voice and thus the user's intention according thereto.

Although there has not shown in the table 400, the processor 210 may figure out a space where the user is located through the sensor 250 or via locations where the voice signal is received. The situation information as above is only an example, and kinds thereof are not limited by the table 400. The situation information may be added by the user, and stored and edited by the user's input. Accordingly, the electronic apparatus may store the situation information optimized to the user to predict the user's intention with greater precision. What the user edits the situation information will be described in detail with reference to FIG. 12.

FIG. 5 shows a method in which the electronic apparatus analyzes the utterance, according to an embodiment. A reference numeral 500 represents a mathematical formula by which the processor 210 identifies a similarity. The similarity S(Vc, Vi) is expressed as a formula as described below.

$$S(Vc, Vi) = 1/((1-a)*Dt(Tc,Ti) + a*Di(Ic,Ii))$$ [Mathematical formula 1]

The similarity S(Vc, Vi) means a similarity between a currently input utterance and an utterance stored in a database. In the similarity S(Vc, Vi), Vc means the currently input utterance and Vi means the utterance stored in the database.

Dt(Tc,Ti) means a difference between an input time of the currently input utterance and an input time of the utterance stored in the database. In Dt(Tc,Ti), Tc means the input time of the currently input utterance and Ti means the input time of the utterance stored in the database.

Di(Ic,Ii) means a difference between a currently input utterance content and an utterance content stored in the database. In Di(Ic,Ii), Ic means the currently input utterance content and Ii means the utterance content stored in the database.

a means a weight for each selection criteria.

The mathematical formula of the similarity S(Vc, Vi) as above is an example, which use the difference Dt between the input times and the difference Di between the utterance contents. Accordingly, in the utterance analysis, the processor 210 may analyze the utterance using the stored situation information in the similarity identification. For instance, the similarity formula may set, so that the more times the number of utterance is, the higher the similarity is; the similarity of utterance gets low if being uttered to carry out an operation, which is currently carrying out, by referring the current functional state of device; or the similarity of utterance content corresponding to an operation of device capable of returning to an average state gets high if being a different state from the average state by referring the space state. The formula of identifying the similarity is not limited thereto. According to this, the electronic apparatus 1 may predict the user's intention according to situations thus to reduce the malfunction thereof. Or, based on a number of times of operation performance, the processor may preferentially identify an operation to apply similarity identification thereto. Accordingly, the electronic apparatus may carry out the operation where the user frequently uses thus to reduce the malfunction thereof.

FIG. 6 shows an operation performance process of the electronic apparatus according to an embodiment. The electronic apparatus 1 may be located in several spaces. As shown in FIG. 6, electronic apparatuses 601 to 604 are located in spaces 1 and 2. Electronic apparatuses 601 and 602 in the space 1 may communicate with a database 600 in which the situation information is stored. The processor 210 may receive a command (Operation S611), and control to select the command in the light of the situation information (Operation S612). The situation information may be stored in the storage of the electronic apparatus 1, but collectively stored in the database 600. At the step (Operation S612) taking account of the situation information, the processer 210 may communicate with the database 600 via the communicator 230. The processer 210 may identify the similarity as in FIG. 5 using the situation information stored in the database 600. Using the result of similarity identification, the electronic apparatus 1 may select the command, which coincides with the situation or the user's intention (Operation S612). The electronic apparatus 1 may carry out an operation corresponding to the selected command (Operation S613).

Next, an example of a process, which analyzes the utterance as the voice command is received will be described. If the voice command is received, the processor 210 selects a candidate group of domains according to an utterance content of the user. The processor 210 may identify the candidate group of domains based on a language dictionary stored in a commonly used database. If the user does not utter a complete sentence, there may be several candidate groups of domains. The processor 210 clusters the candidate groups of domains corresponding to the input utterance of the user to select a space including the most similar domain from among of a plurality of compartmental spaces. The processor 210 may identify a final domain based on situation information of the corresponding space. If the final domain identified by the processor is one and the electronic apparatus 1, which will carry out an operation according to the identified final domain, is one, the electronic apparatus 1 may carry out the operation (Operation S613). However, if the candidate groups of domains are the same in similarity so that the final domain identified by the processor is plural, or the electronic apparatus 1, which will carry out the operation according to the identified final domain, is plural, the processor 21 may select a service that the user want. The service that the user want may be selected using a user interface (UI) displayed on the screen by the operation performer 260 or a voice input via the speaker. Accordingly, the user may conveniently edit the situation information.

The electronic apparatus 1 may manage the database 600 according to located spaces. Or, the electronic apparatus 1 may internally manage the database 600 according to families. The database 600 may be disposed the outside, so that it is managed with an electronic apparatus 1 such as an external server or the like. In other words, the database 600 may be included in the electronic apparatus 1 that carries out the operation or other electronic apparatus 1 that does not carry out the operation.

According to another embodiment, when the electronic apparatus 603 in the space 2 receives an command (Operation S611) and select the command in the light of the situation information stored in the database 600 (Operation S612), if as a result of similarity identification, a user's intention is identified to operate the electronic apparatus 602 in the space 1, the electronic apparatus 602 in the space 1 may be controlled to carry out an operation corresponding to the command (Operation S613). In other words, the electronic apparatus 603 of receiving the command and the electronic apparatus 602 of carrying out the command may be different from each other, and located in different spaces from each other.

Figure 7:
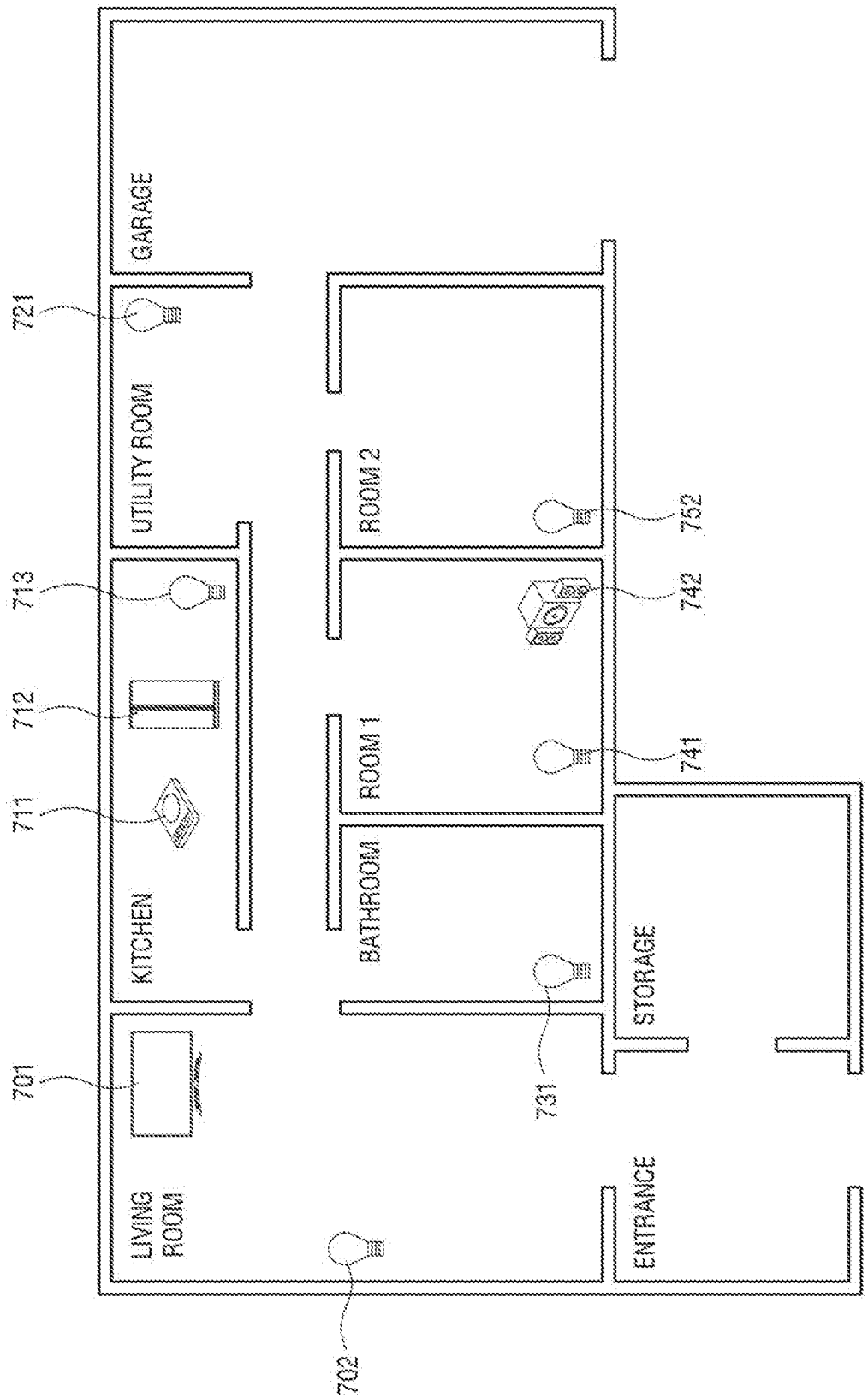
FIG. 7 shows an arrangement example of the electronic apparatus according to an embodiment.

FIG. 7 shows an arrangement example of the electronic apparatus according to an embodiment. As described above, kinds of the electronic apparatus are not limited. In a living room are located a TV 701, which is able to display an image or output an audio, and an illumination 702, which is able to change an illuminance. In a kitchen are located a cooktop 711, which is able to heat food, a refrigerator 712, which is able to adjust an inner temperature therein, and an illumination 713. In a utility room, a bathroom, a room 1 and a room 2 are located illuminations 721, 731, 741 and 751, respectively. In the room 1 is located a speaker 742, which is able to output an audio. For the sake of explanations, the database 600 is not shown in FIG. 7 and may be included in the electronic apparatus 1 or separately located the outside, as described with reference to FIG. 6. Since explanations about the electronic apparatuses 1 located respectively on the spaces described in FIG. 7 are equally used with respect to FIGS. 8 to 10, they will be omitted in explanations about FIGS. 8 to 10.

Figure 8:
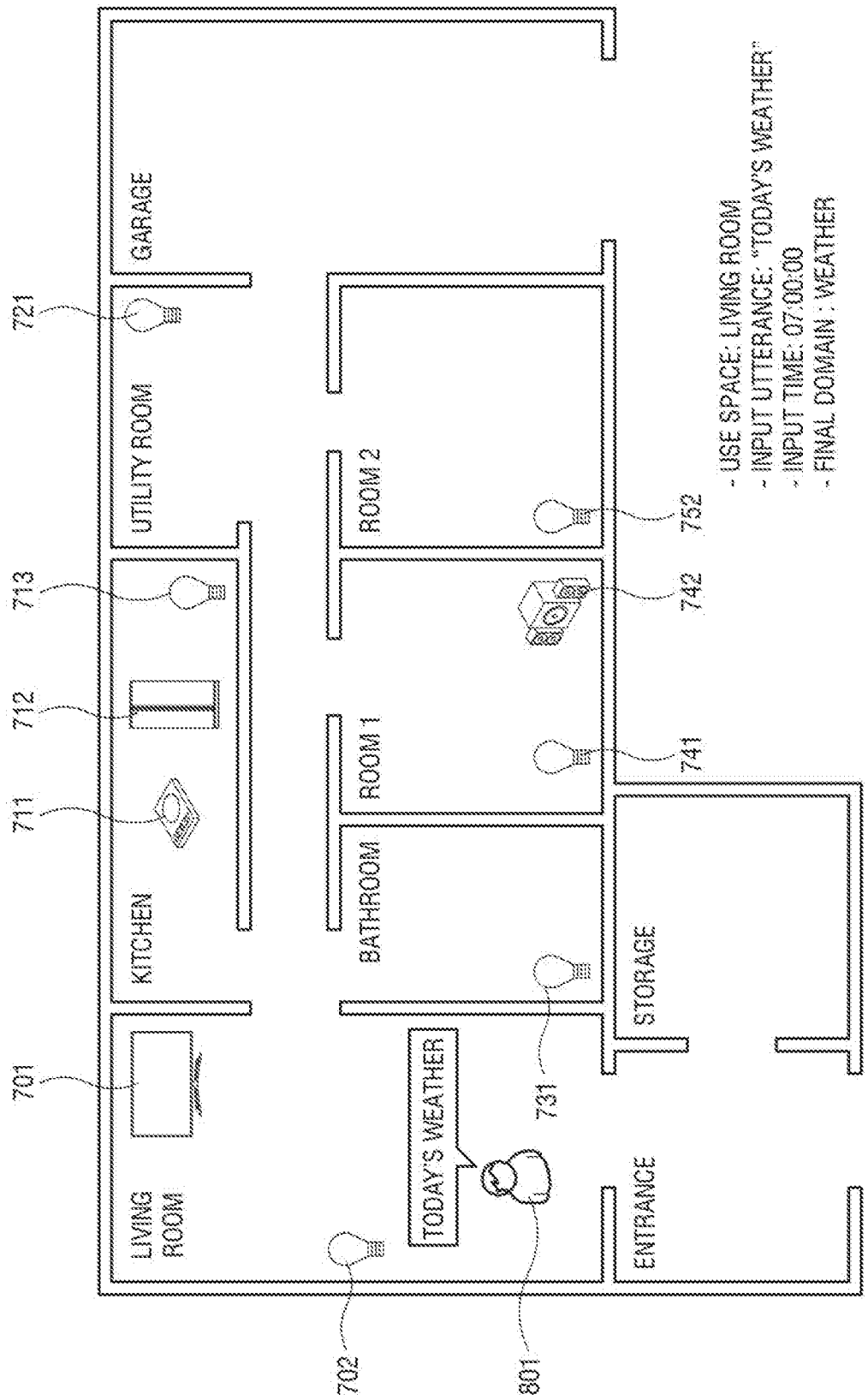
FIG. 8 shows an operation example of the electronic apparatus according to an embodiment.

FIG. 8 shows an operation example of the electronic apparatus according to an embodiment. The explanations of FIG. 8 is described by reference to the situation information of the table 400 shown in FIG. 4.

It is assumed that when a user 801 utters "today's weather", a space where the user 801 utters is a 'living room', a content uttered by the user is 'today's weather, and a time uttered by the user is 7 a.m. In response such an utterance, the processor 210 may identify 'weather', 'music' and 'food' from among the candidate groups of domains.

In the domain 'music' is stored an utterance content 'Turn on today's weather', or in the domain 'food' is stored an utterance content 'Recommend good food for today's weather'. As a result of similarity identification in date and time at the domain 'music', the processor 210 may identify that the domain 'music' is low in similarity since there is a time difference. Also, as a result of similarity identification in date and time at the domain 'food', the processor 210 may identify that the domain 'food' is high in similarity since there is a small time difference, but low in similarity since a space uttered by the user is different.

In the domain 'weather' is stored that the number of utterance for the TV (Device ID: 1) is two, the date and time thereof is 8 a.m. on August 22 and 7:30 a.m. on August 23, the utterance content thereof is 'Let me know today's weather' and 'How's the weather today?' respectively corresponding to the date and time thereof. The processor 210 may identify that the domain 'weather' is high in similarity since the number of utterance is large, the time difference is small, and the space uttered by the user is the same. Accordingly, the processor 210 may identify the domain 'weather' having highest similarity as a final domain. As the final domain is identified, the processor 210 may control the TV 701 to carry out an operation, which informs the user of the today's weather.

Figure 9:
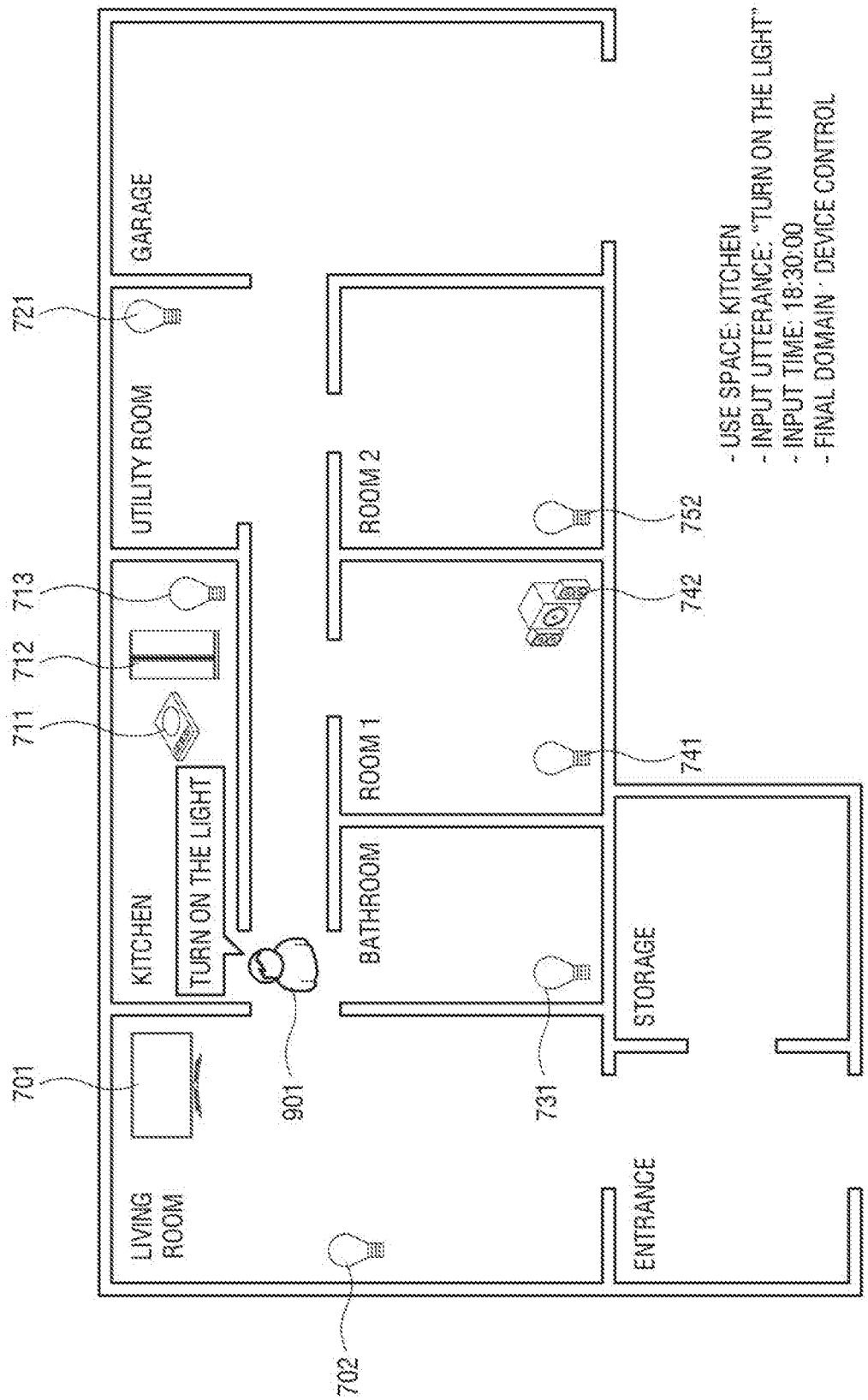
FIG. 9 shows another operation example of the electronic apparatus according to an embodiment.

FIG. 9 shows another operation example of the electronic apparatus according to an embodiment. Explanations of FIG. 9 will be described by reference to the situation information of the table 400 shown in FIG. 4.

In FIG. 9, it is assumed that a user 901 wants to heat the cooktop 711. If the user 901 utters a complete sentence, such as "Turn on the cooktop in the kitchen" or the like, the processor 210 may control the cooktop 711 to be turned on and heated if there is no other reason. As described above, if all information, such as a device to operate, a space in which the device is located, an operation to be carried out by the device, etc., is provided, the processor 210 may control the cooktop 711 to be turned on and heated. However, with respect to an utterance content as below, it may be difficult for the processor 210 to select a proper command. For example, the user utters "Turn on". This utterance may correspond to a free utterance. As a result, it may be difficult for the processor 210 to control a proper device to carry out an operation thereof. However, if the processor 210 carries out the utterance analysis process as described by reference to FIGS. 4 to 6, it may control the device to carry out an operation, which coincides with a user's intention.

The space uttered by the user 901 is the 'kitchen', the utterance content is 'Turn on', and the utterance time is 6:30 p.m. The processor 210 selects 'illumination' and 'device control' as candidate groups of domains. In the domain 'illumination' among the candidate groups of domains is stored the utterance content 'Turn on'. As the space, which corresponds to the domain 'illumination' among the candidate groups of domains, there are two places of the living room and the kitchen.

In the current functional state, which corresponds to the domain 'illumination' among the candidate groups of domains, an illumination (Device ID: 2) of the living room is 'Off', and a TV (Device ID: 5) of the kitchen is 'On'. The date and time, which corresponds to the domain 'illumination' among the candidate groups of domains, is 7 p.m. on August 23 and 7:30 a.m. on August 23. If the processor 210 carries out the utterance analysis of the time, the current functional state, etc. with respect to the domain 'illumination' among the candidate groups of domains, it may calculate the illumination (Device ID: 2) of the living room as having a higher similarity than the illustration (TV, Device ID: 5) of the kitchen since the illustration of the kitchen is already in a 'On' state.

In the domain 'device control' among the candidate groups of domains is stored an utterance content 'Turn on'. As a space, which corresponds to the domain 'device control' among the candidate groups of domains, there is one place of the kitchen. In the current functional state, which corresponds to the domain 'device control' among the candidate groups of domains, the cooktop (Device ID: 3) is 'Off'. The date and time, which corresponds to the domain 'device control' among the candidate groups of domains, is 5 p.m. on August 23.

The processor 210 finally calculates similarities at the domains 'illumination (the speaker of the living room)' and 'device control (the cooktop of the kitchen)'. If the processor 210 calculates the similarities of the current functional state of device and the space of the user 901, the domain 'device control' may have the highest similarity. Accordingly, the processor 210 may identify the domain 'device control' having the highest similarity as a final domain. As the final domain is identified, the processor 210 may control the cooktop 711 to carry out the heating operation thereof.

Figure 10:
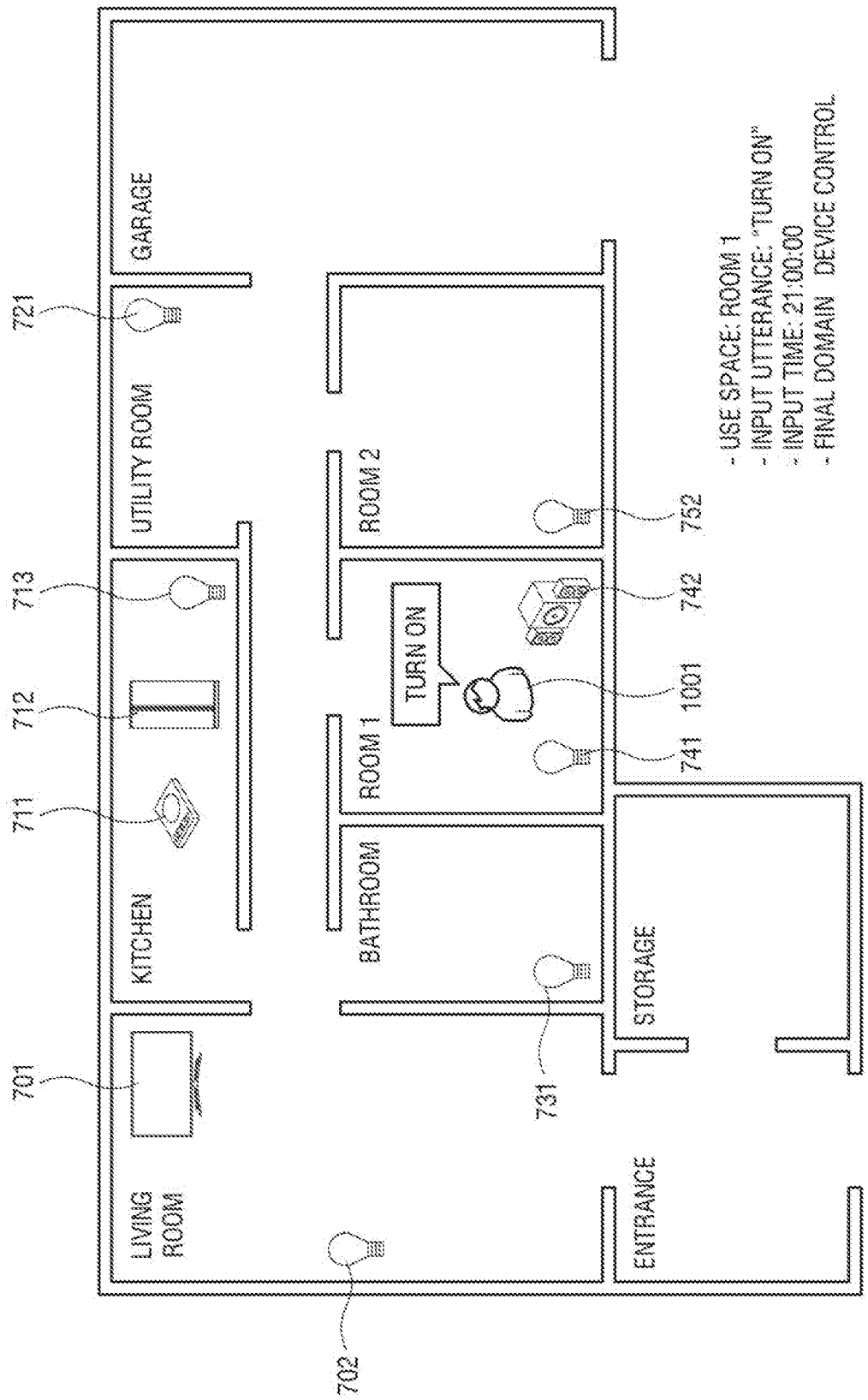
FIG. 10 shows further operation example of the electronic apparatus according to an embodiment.

FIG. 10 shows further operation example of the electronic apparatus according to an embodiment. Explanations of FIG. 10 will be described by reference to the situation information of the table 400 shown in FIG. 4.

In FIG. 10, it is assumed that a user 1001 wants to turn on the speaker 742 in the room 1. If the user 1001 utters a complete sentence, such as "Turn on the speaker in the room 1" or the like, the processor 210 may control speaker 742 to be turned on if there is no other reason. As described above, if all information, such as a device to operate, a space in which the device is located, an operation to be carried out by the device, etc., is provided, the processor 210 may control to turn on the speaker 742. However, with respect to an utterance content as below, it may be difficult for the processor 210 to select a proper command. For example, the user utters "Turn on". This utterance may correspond to a free utterance. As a result, it may be difficult for the processor 210 to control a proper device to carry out an operation thereof. However, if the processor 210 carries out the similarity calculation process as described by reference to FIGS. 4 to 6, it may control the device to carry out an operation, which coincides with an intention of the user 1001.

The space uttered by the user 1001 is the 'room 1', the utterance content is 'Turn on', and an utterance time is 9 p.m. The embodiment of FIG. 10 will be described limiting the use space in the room 1. Among candidate groups of domains, there is 'device control'. In the domain 'device control', there are two devices of an illumination 741 of the room 1 and a speaker 742. In situation information of the illumination 741, the number of utterance is 5, the illumination 741 is in a turned-on state at present, and the time when the utterance has been carried out is 9:20 p.m. In situation information of the speaker 742, the number of utterance is 0 and the speaker 741 is in a turned-off state at present. If considering the number of utterance and the utterance time, the processor 210 may calculate that the illumination 741 of room 1 is high in similarity and thus control the illumination 741 of room 1 to carry out a function thereof. However, since in current functional state of the electronic apparatus, the illumination 741 is in the turned-on state at present, there is no more operation for which the processor 210 may control to carry out. If using situation information, such as the current functional state or the like, it may be seen that turning on the illumination 741 of the room 1, which is already turned on, is not user's intention. Accordingly, if considering the current functional state, the processor 210 may calculate that instead of the illumination 741 of the room 1, the speaker 741 is high in similarity. Thus, to meet the user's intention, the processor 210 may control the speaker 742 to be turned on.

Figure 11:
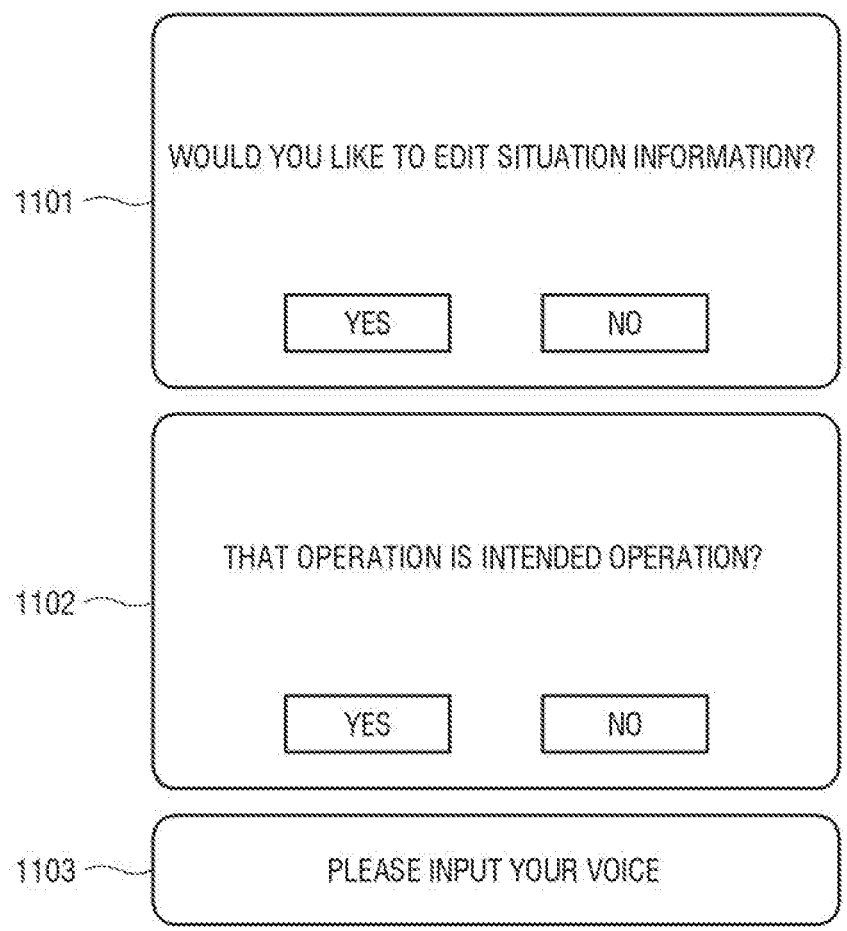
FIG. 11 shows examples of a user interface (UI) according to an embodiment.

FIG. 11 shows examples of a user interface (UI) according to an embodiment. The processor 210 controls to store the situation information described with respect to FIG. 4. The user may want to edit the stored situation information. Accordingly, as shown in reference numeral 1101, the processor 21 may display a UI through the operation performer 260 to ask the user whether to edit situation information. The reference numeral 1101 represents the UI displayed through a screen. The processor 210 may control to ask the user whether to edit the situation information using a voice instead of the screen. In other words, if the electronic apparatus 1 is provided with a speaker, the processor 210 may ask the user whether to edit the situation information by voice. As the user edits the situation information, the user may more properly select an operation, which coincides with her or his intention. Accordingly, the user may conveniently edit the situation information. Explanations about which the user edits the situation information will be described with reference to FIG. 12.

As results that the processor 210 calculates the similarity, there may be more than two operations, which are the same in similarity. Accordingly, to identify one operation from more than two operations, the processor 210 may control to ask the user with respect to her or his intended operation. As shown in reference numeral 1102, the processor 210 may display a UI through the operation performer 260 to ask the user whether an operation identified by the processor 210 is an operation intended by her or him. The reference numeral 1102 represents the UI displayed through a screen. The processor 210 may control to ask the user whether the identified operation is the intended operation by voice. Accordingly, the electronic apparatus 1 may conform and learn whether the identified operation is the intended operation.

If the voice input of the user is required, as shown in reference numeral 1103, the processor 210 may output a UI via the screen. Or, the processor 210 may control to request the user to input a voice via the speaker.

FIG. 12 shows another example of an UI according to an embodiment. Reference numeral 1200 represents a process of editing the situation information marked with reference numeral 400 in FIG. 4. The user may edit an identification (ID) of the electronic apparatus 1, a use space 1202, a date and time 1203, an utterance content 1204, an execution operation 1205, a number of utterance 1206, a user 1207, etc. Kinds of the situation information are limited to items listed above, and may further include other information. Detailed contents of the situation information may be selected or additionally input by the user. Methods, which additionally input the detailed contents, may include inputting by voice, and inputting methods and means are not limited. The electronic apparatus 1 may classify the stored situation information according to users, spaces or devices, and efficiently operate on the command of the user using the classified information. As described above, the user may edit the situation information, thereby efficiently predicting the user's intention.

The invention claimed is:
1. An electronic apparatus comprising:
a communicator configured to communicate with a plurality of external apparatus;
a storage configured to store situation information;
a processor configured to:
based on to a first utterance of a user, control to carry out a first operation corresponding to the first utterance from among a plurality of operations related to the plurality of external apparatuses,
store, in the storage, situation information corresponding to each of a plurality of situations where the first operation is carried out based on the first utterance,
based on a second utterance of the user, identify a second operation corresponding to the second utterance from among the plurality of operations based on the stored situation information, and
control to carry out the identified second operation.
2. The apparatus according to claim 1, wherein the situation information comprises a plurality of factors including at least one of a device, a space, a time, or a space state.
3. The apparatus according to claim 1, wherein the processor is configured to identify the second operation by further considering a similarity in at least one factor from among a plurality of factors, and a similarity of utterance content.
4. The apparatus according to claim 1, wherein the processor is configured to store or edit the situation information according to an input of the user.
5. The apparatus according to claim 1, further comprising:
a display configured to output a screen, wherein the processor is configured to store or edit the situation information by using a user interface (UI) output on the screen.

6. The apparatus according to claim 1, wherein the processor is configured to preferentially identify an operation to apply similarity identification thereto based on a number of times of operation performance.

7. The apparatus according to claim 1, wherein the processor is configured to classify and store the situation information according to categories of a plurality of factors.

8. The apparatus according to claim 1, wherein the processor is configured to classify and store the situation information according to users of a plurality of factors.

9. A control method of an electronic apparatus, comprising:
- based on to a first utterance of a user, controlling to carry out a first operation corresponding to the first utterance from among a plurality of operations related to a plurality of external apparatuses, which is able to communicate with the electronic apparatus through a communicator thereof;
- storing, in a storage, situation information corresponding to each of a plurality of situations where the first operation is carried out based on the first utterance;
- based on a second utterance of the user, identifying a second operation corresponding to the second utterance from among the plurality of operations based on the stored situation information, and
- controlling to carry out the identified second operation.

10. The method according to claim 9, wherein the situation information comprises a plurality of factors including at least one of a device, a space, a time, or a space state.

11. The method according to claim 9, wherein the identifying comprises identifying the second operation by further considering a similarity in at least one factor from among a plurality of factors, and a similarity of utterance content.

12. The method according to claim 9, further comprising: storing or editing the situation information according to an input of the user.

13. The method according to claim 9, further comprising: storing or editing the situation information by using a user interface (UI) output on a screen through a display configured to output the screen.

14. The method according to claim 9, wherein the identifying comprises preferentially identifying an operation to apply similarity identification thereto based on a number of times of operation performance.

15. A computer program product, comprising:
- a memory configured to store instructions; and
- a processor,
- wherein when being carried out by the processor, the instructions are configured to control an electronic apparatus to:
- based on to a first utterance of a user, carry out a first operation corresponding to the first utterance from among a plurality of operations related to a plurality of external apparatuses, which is able to communicate with the electronic apparatus through a communicator thereof;
- store, in a storage, situation information corresponding to each of a plurality of situations where the first operation is carried out based on the first utterance;
- based on a second utterance of the user, identify a second operation corresponding to the second utterance from among the plurality of operations based on the stored situation information, and
- carry out the identified second operation.

* * * * *